United States Patent
Schmidt et al.

(10) Patent No.: US 6,307,296 B1
(45) Date of Patent: *Oct. 23, 2001

(54) COMMUTATOR

(75) Inventors: Ralf Schmidt, Renchen; Martin Kiefer, Oberkirch, both of (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/319,531
(22) PCT Filed: Sep. 14, 1998
(86) PCT No.: PCT/DE98/02710
    § 371 Date: Jun. 8, 1999
    § 102(e) Date: Jun. 8, 1999
(87) PCT Pub. No.: WO99/19946
    PCT Pub. Date: Apr. 22, 1999

(30) Foreign Application Priority Data

Oct. 8, 1997 (DE) ................................. 197 44 357

(51) Int. Cl.$^7$ .................................................. H01R 39/16
(52) U.S. Cl. .................... 310/233; 310/42; 310/235; 310/236
(58) Field of Search .................... 310/236, 233, 310/231, 235, 42

(56) References Cited

U.S. PATENT DOCUMENTS

| 3,129,350 | * | 4/1964 | Clark | 310/235 |
| 3,566,460 | * | 3/1971 | Yamaguchi | 310/236 |
| 3,996,660 | * | 12/1976 | Hancosk | 310/235 |
| 4,071,796 | * | 1/1978 | Nippert | 310/236 |
| 4,705,977 | * | 11/1987 | Shibata et al. | 310/235 |
| 5,140,213 | * | 8/1992 | Nettelhoff et al. | 310/219 |
| 5,760,517 | * | 6/1998 | Stoplmann | 310/233 |

\* cited by examiner

*Primary Examiner*—Burton S. Mullins
(74) *Attorney, Agent, or Firm*—Ronald E. Greigg; Edwin E. Greigg

(57) ABSTRACT

When a commutator is slipped onto a rotor shaft that is provided with viscous epoxy, a bead of epoxy forms on the connecting end face of the commutator core and can hinder the process of winding the rotor.

The novel commutator therefore has a receiving bore (25), which begins at the connecting end face (23) of the commutator and extends coaxially to the longitudinal axis (1) as far as a shoulder (26) and is adjoined by a conical bore (29) tapering toward a through bore (24). The bead (22) of epoxy that forms when the commutator is slipped onto the rotor shaft is completely covered by the receiving bore (25).

The commutator is especially suitable for rotors of electrical machines.

6 Claims, 1 Drawing Sheet

COMMUTATOR

PRIOR ART

The invention is based on a commutator as set forth hereinafter. One commutator has already been proposed (German Patent Application 197 06851.0), which beginning at a connecting end face has at least one recess, extending toward a through bore, and in the mounting of the commutator on a rotor shaft, epoxy resin can penetrate this recess and thereby fix the commutator to the rotor shaft. A bead of the epoxy composition forms on the connecting end face of the commutator in the process, but its outer contour is relatively undefined, so that repeatedly problems occur in winding the rotor winding.

ADVANTAGES OF THE INVENTION

The commutator of the invention has the advantage over the prior art that in a simple way, a fixation of the commutator by means of the insulating means (epoxy-based coating powder) applied to the rotor shaft and the rotor core is possible without forming a bead of the insulating means that impairs winding of the rotor winding. To that end, the through bore of the commutator can be made with a clearance fit or transition fit to the rotor shaft, so that when it is mounted, the commutator can be slipped easily onto the rotor shaft, thus avoiding both damage to the surface of the rotor shaft and internal strains in the commutator.

By the provisions recited herein, advantageous refinements of and improvements to the commutator are possible.

It is advantageous to make the receiving bore cylindrical, which creates a large receiving cross section for the bead of insulating means.

It is also advantageous, beginning at the shoulder, to form at least one indentation in the conical bore or to provide at least one indentation in the wall of the receiving bore, in order to assure secure, form-locking fixation of the commutator to the rotor shaft in a manner fixed against relative rotation.

BRIEF DESCRIPTION OF THE DRAWING

One exemplary embodiment of the invention is shown in simplified form in the drawing and described in detail below.

DESCRIPTION OF THE EXEMPLARY EMBODIMENT

Figure 1:
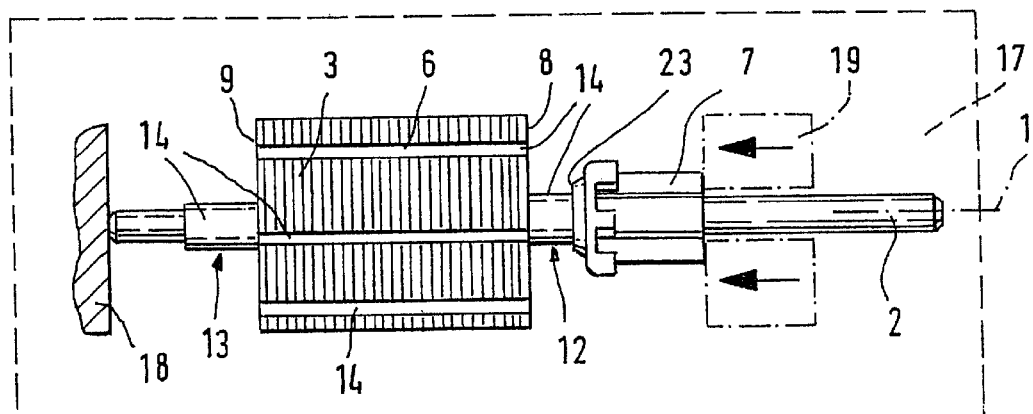
FIG. 1 shows a rotor with a commutator slipped onto the rotor shaft.
Figure 2:
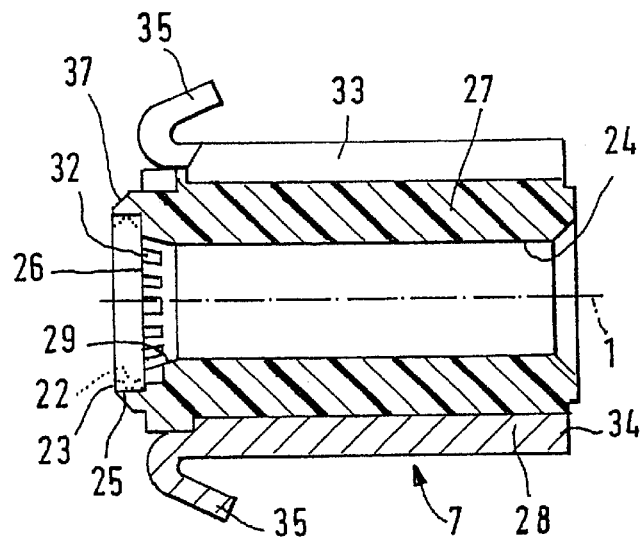
FIG. 2 shows a commutator embodied according to the invention in longitudinal section taken along the line II—II of FIG. 3.
Figure 3:
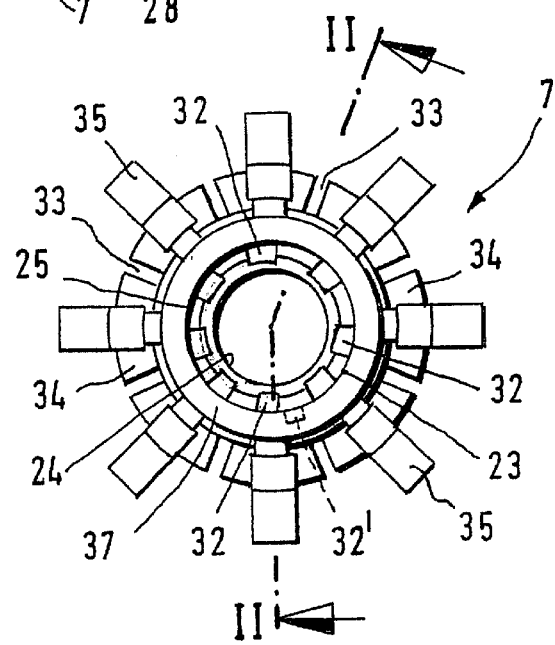
FIG. 3 shows a commutator of FIG. 2 in a side view.

In FIG. 1, a rotor for an electrical machine, such as an electric motor, is shown, with a longitudinal axis 1, a rotor shaft 2 extending coaxially to that axis, and a rotor core 3 slipped with a press fit coaxially onto the rotor shaft 2. The rotor core 3 is made as a lamination package in a known manner from individual sheet-metal laminations and has a plurality of winding slots 6, extending parallel to the longitudinal axis 1, which extend from a first end face 8, toward a commutator 7 (or collector or current inverter) to a second end face 9, remote from the commutator 7, of the rotor core 3. The winding slots 6, first end face 8 and second end face 9 of the rotor core 3, and a first portion 12 of the rotor shaft 2 located between the rotor core 3 and the commutator 7, and a second portion 13 of the rotor shaft 2 adjoining the rotor core 3 are all covered with a sintered epoxy layer 14 acting as an insulating means. To that end, the rotor, without a commutator, is covered with masks in the regions of the rotor shaft 2 and rotor core 3 that are not to be provided with an epoxy layer 14, and the rotor thus equipped is introduced into a coating system 17, suggested by dashed lines, in which electrostatically charged epoxy powder in a fluidized powder bath deposits on the regions of the rotor shaft 2 and rotor core 3 not covered with masks, so that both the portions 12 and 13 of the rotor shaft 2 and the first end face 8, second end face 9 and winding slots 6 of the rotor core 3 are all covered with a layer of epoxy powder. The outer jacket of the rotor core 3 is covered as well. This powder layer on the outer jacket of the rotor core is removed again in a subsequent operation by blasting, suction or stripping, so that the outer jacket is free of powder. After that, the temperature in the coating system 17 is elevated until such time as the epoxy powder has heated to its temperature of plasticization and curing, which is at approximately 240° C., and at which the epoxy powder becomes a viscous composition. In this state, the commutator 7 is slipped onto the rotor shaft 2, which is located near its second portion 13 on a retaining stop 18, by means of a pushing tool 19 suggested in dot-dashed lines, in such a way that part of the viscous epoxy layer 14 present on the first portion 12 of the rotor shaft 2 bulges radially outward in the form of a bead 22, shown in dotted lines, in the region of a connecting end face 23 of the commutator 7 and penetrates an annular gap formed between the circumference of the rotor shaft 2 and an inner wall surface of the commutator core that forms a through bore 24 After the curing of the epoxy and the cooling of the rotor, the commutator 7 is fixed in the axial direction and secured against relative rotation solely by the epoxy 14 on the rotor shaft 2. As shown in FIGS. 2 and 3, the commutator 7 has a cylindrical commutator core 27 of a thermosetting plastic, which is sheathed with a metal conductor sleeve 28, especially of copper. The through bore 24 extends in the commutator core 27 has a gap between the inner wall surface of the commutator and the circumference of the rotor shaft 2 which forms a non-interference fit connecting end face 23, the commutator 7 has a receiving bore 25, which extends coaxially to the through bore 24 in the direction of the longitudinal axis as far as a shoulder 26 shown in FIG. 2. Beginning at the shoulder 26, a conical bore 29 tapering toward the through bore 24 adjoins it, its diameter being less than that of the receiving bore 25. The tapering conical bore 29 enables an easy, uniform penetration of the viscous epoxy into the annular gap formed between the circumference of the rotor shaft 2 and the inner wall surface of the commutator core which forms the through bore 24. For better fixation of the commutator 27 in the rotary direction, indentations 32 in the commutator core 27 are provided in the conical bore 29 of the commutator 7, beginning at the shoulder 26. As shown in dashed lines in FIG. 2, instead of the indentations 32, indentations 32' may also be provided in the wall of the receiving bore 25. The cross section of the indentations 32, 32' may be rectangular, triangular, semicircular, or the like. The bead 22 of epoxy 14, located entirely inside the receiving bore 25, radially and axially covers the indentations 32, 32' and extends into them. The receiving bore 25 is embodied cylindrically, as shown in FIG. 2, but may also be embodied such that it tapers toward the conical bore 29.

Commutator slots 33 extending in the direction of the longitudinal axis 1 divide the conductor sleeve 28 into individual segments 34, electrically insulated from one another, which each have one connecting hook 35 toward the connecting end face 23. One connecting wire of the rotor winding is electrically connected to one each of the connecting hooks 35 by clamping.

Beginning at the connecting end face 23, a wire guide face 37 extends in inclined fashion relative to the longitudinal axis 1 and aimed at each connecting hook 35. It is on this wire guide face 37 that the winding wire rests when wound around the connecting hook 35. The wire extends from the connecting hook 35 over the wire guide face 37 to the rotor shaft 2. Because the wire is supported here, the risk of vibration of the wire is reduced, which leads to increased resistance of the rotor to jarring.

The foregoing relates to preferred exemplary embodiments of the invention, it being understood that other variants and embodiments thereof are possible within the spirit and scope of the invention, the latter being defined by the appended claims.

What is claimed is:

1. A commutator for an electrical machine that has a rotor with a rotor shaft, comprising a cylindrical commutator core of a thermosetting plastic, an axial through bore in said cylindrical commutator core for slipping said commutator core onto the rotor shaft, a connecting end face (23) of said core extending transversely to the through bore, wherein a receiving bore (25) of a greater diameter than said through bore originates at the connecting end face (23) in the commutator core (27) coaxially to the through bore (24) and extends as far as a shoulder (26), and a conical bore (29) adjoins the shoulder (26) with a lesser diameter than that of the receiving bore (25) and said conical bore tapers toward the through bore (24), said through bore (24) has a non-interference fit relative to the circumference of the rotor shaft (2) and for better fixation of the commutator (7) on the rotor shaft (2), at least one indentation (32, 32') is provided on the commutator core (27), said at least one indentation (32, 32') is open in a direction to the receiving bore (25).

2. The commutator according to claim 1, in which the receiving bore (25) is embodied cylindrically.

3. The commutator according to claim 2, in which beginning at the shoulder (26), said at least one indentation (32) is embodied in the conical bore (29).

4. The commutator according to claim 2, in which said at least one indentation (32') is provided in a wall of the receiving bore (25).

5. The commutator according to claim 1, in which beginning at the shoulder (26), said at least one indentation (32) is embodied in the conical bore (29).

6. The commutator according to claim 1, in which said at least one indentation (32') is provided in a wall of the receiving bore (25).

* * * * *